W. J. CARROLL,

Assignor, by mesne assignments, to the AMERICAN COTTON TIE COMPANY, LIMITED

Cotton Bale-Tie.

No. 7,924. Reissued Oct. 23, 1877.

*Witnesses:*
Robt. H. Duncan
James Kearney

*Inventor:*
William J. Carroll
by Saml. A. Duncan
Atty.

N. PETERS, PHOTO-LITHOGRAPHER, WASHINGTON, D. C.

UNITED STATES PATENT OFFICE.

WILLIAM J. CARROLL, OF NATCHEZ, MISSISSIPPI, ASSIGNOR, BY MESNE ASSIGNMENTS, TO THE AMERICAN COTTON TIE COMPANY, LIMITED.

IMPROVEMENT IN COTTON-BALE TIES.

Specification forming part of Letters Patent No. 52,137, dated January 23, 1866; Reissue No. 7,924, dated October 23, 1877; application filed September 5, 1877.

*To all whom it may concern:*

Be it known that I, WILLIAM J. CARROLL, of Natchez, in the State of Mississippi, have invented a new and useful Improvement in Bale-Ties, of which the following is a specification:

The present invention relates to a class of metallic bale-ties which may be designated as "button-ties," being ties in which the two ends of the band or hoop are fastened together around the bale by means of a button or cleat attached to one end, and adapted to take into holes formed in the other end. The object is to provide a tie combining strength and simplicity, and in which, while the ends can be fastened easily, they will not readily disengage without a fracture of the parts.

Figure 1:
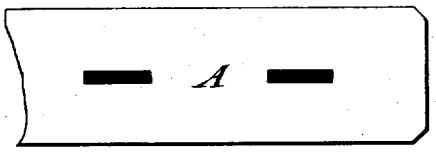
Figure 2:
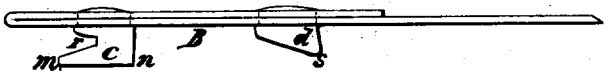
Figure 3:
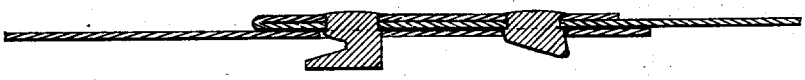
Figure 4:
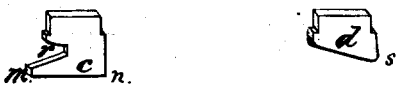

The invention is fully illustrated in the accompanying drawings, in which Figure 1 is a plan view of one end, A, of the ordinary iron band or hoop used on cotton-bales, and provided with slots in accordance with the present invention. Fig. 2 is a side view of the other end, B, showing the cleat *c* and its locking-key *d*, which take into the slots in the end A; and Fig. 3 is a longitudinal section, showing the two ends as fastened together when the tie is applied to a bale of cotton or other compressible material.

The holes in the perforated end of the band are narrow, of uniform width, and elongated in the direction of the length of the band, and the cleat and its key, as well as the rivets that secure them to the band, are correspondingly shaped. This form, both of rivet, of cleat and slot, is adopted in order to secure the requisite strength in the fastening devices with the minimum weakening of the band from cutting away the metal composing its width.

The cleat *c* is made with a projecting toe, *m*, and the length of the cleat from its toe to its heel *n* is greater than that of the slot it is designed to enter. It results from this that, when the tie has been fastened on a bale, it will be impossible to disengage its ends by a direct lift—*i. e.*, by moving them away from each other in parallel planes. They can only be disengaged by tilting them upon each other, and as they can hardly ever be brought into this relative position save by design, and when the bale is in the press, it follows that, so far as this element goes, this form of fastening is very reliable.

In order to hold the two ends of the band against longitudinal movement on each other, and thus tie them together the more securely, the end B is provided with a stud or key, *d*, which takes into the slots in the perforated end of the band; and in order the better to resist any liability of the two ends to tilt on each other, the heel *s* of this key may be made somewhat inclined rearwardly, as shown. The notch *r* in the cleat gives sufficient play to the parts to permit the key to enter its slot readily, and the friction of the inclined heel against the end of the slot, when the parts are drawn taut by the expansion of the bale, opposes measurably any force tending to raise the key from its place. This key is shown as fastened to the band at a distance from the cleat equal to the distance of the two adjacent slots apart. By thus separating the key from the cleat it serves the additional purpose of bracing the cleat against lateral torsion and strain, and in this respect it acts more efficiently than if it were closed up against, and made to form a simple extension of, the cleat itself.

In order to give greater security to the rivets which hold the cleat and the key, the end of the band is re-enforced by an extra plate of metal, which conveniently is provided by bending over the end of the band upon itself. This gives a more extended bearing for the rivets, and permits the cleat to be set nearer the end of the band without the danger of splitting it.

What is claimed as new is—

1. A metallic bale-tie one end of which is slotted, while the other end has secured to it a fastening device of greater length than the slot which it is designed to enter, the parts being constructed to operate substantially as above set forth.

2. A metallic bale-tie pierced at one end with narrow elongated openings of substantially uniform width, and having secured to the other end a narrow elongated fastening device, corresponding to such slots.

3. In combination with a fastening device attached to one end of a metallic bale-tie, and adapted to take into a slot in the other end thereof, a stud or key attached to the same end with such fastening device, and operating to hold the parts against longitudinal play, substantially as described.

4. In combination with a fastening device attached to one end of a metallic bale-tie, a stud or key fastened to the same end at a distance from such device, and operating to hold the parts against lateral displacement, substantially as described.

5. In combination with an iron bale-tie band, a cleat or button secured thereto by means of a narrow elongated rivet, substantially as and for the purpose described.

6. In combination with a cleat or button riveted to the end of an iron bale-tie band, the re-enforcement on the end of the band, substantially as and for the purpose set forth.

WILLIAM J. CARROLL. [L. S.]

Witnesses:

WM. SCHOFIELD,

R. EMMETT MAHER.